US012789157B2

(12) United States Patent
Olsen et al.

(10) Patent No.: US 12,789,157 B2
(45) Date of Patent: Nov. 10, 2026

(54) ORIFICE DRIVEN HYDROXYL COMBUSTION OXIDATION

(71) Applicant: Applied Materials, Inc., Santa Clara, CA (US)

(72) Inventors: Christopher S. Olsen, Fremont, CA (US); Sameh Helmy, Santa Clara, CA (US); Hansel Lo, San Jose, CA (US); Eric Kihara Shono, San Mateo, CA (US)

(73) Assignee: Applied Materials, Inc., Santa Clara, CA (US)

( * ) Notice: Subject to any disclaimer, the term of this patent is extended or adjusted under 35 U.S.C. 154(b) by 414 days.

(21) Appl. No.: 18/138,367

(22) Filed: Apr. 24, 2023

(65) Prior Publication Data

US 2024/0350994 A1 Oct. 24, 2024

(51) Int. Cl.
*B01J 6/00* (2006.01)

(52) U.S. Cl.
CPC ...... *B01J 6/008* (2013.01); *B01J 2219/00594* (2013.01); *B01J 2219/00959* (2013.01)

(58) Field of Classification Search
CPC .............. B01J 6/008; B01J 2219/00594; B01J 2219/00959
USPC .......... 431/12, 175, 176; 118/725, 715, 50.1
See application file for complete search history.

(56) References Cited

U.S. PATENT DOCUMENTS

| | | | |
|---|---|---|---|
| 5,169,453 | A | 12/1992 | Takagi |
| 5,169,684 | A | 12/1992 | Takagi |
| 5,474,612 | A | 12/1995 | Sato et al. |
| 5,779,797 | A | 7/1998 | Kitano |
| 5,848,889 | A | 12/1998 | Tietz et al. |
| 5,879,128 | A | 3/1999 | Tietz et al. |
| 5,960,555 | A | 10/1999 | Deaton et al. |
| 6,133,152 | A | 10/2000 | Bierman et al. |
| 6,200,388 | B1 | 3/2001 | Jennings |
| 6,264,467 | B1 | 7/2001 | Lue et al. |
| 6,280,183 | B1 | 8/2001 | Mayur et al. |
| 6,395,363 | B1 | 5/2002 | Ballance et al. |
| 6,454,865 | B1 | 9/2002 | Goodman et al. |
| 6,494,955 | B1 | 12/2002 | Lei et al. |
| 6,888,104 | B1 | 5/2005 | Ranish et al. |

(Continued)

FOREIGN PATENT DOCUMENTS

| | | | |
|---|---|---|---|
| CN | 115210852 | A | 10/2022 |
| JP | 05-238882 | A | 9/1993 |

(Continued)

OTHER PUBLICATIONS

International Search Report and Written Opinion dated Jul. 31, 2024 for Application No. PCT/US2024/022973.

(Continued)

*Primary Examiner* — Vivek K Shirsat
(74) *Attorney, Agent, or Firm* — Patterson + Sheridan, LLP

(57) ABSTRACT

Systems and methods of orifice driven hydroxyl combustion oxidation include introducing a first gas via at least a first orifice into a processing chamber having a substrate disposed on a substrate support. A second gas is introduced into the processing chamber via a plurality of second orifices. The plurality of second orifices are oriented substantially perpendicular to the at least a first orifice. A radical is produced as a function of the first gas and the second gas while heating the chamber.

20 Claims, 8 Drawing Sheets

(56) References Cited

U.S. PATENT DOCUMENTS

| | | | |
|---|---|---|---|
| 7,127,367 | B2 | 10/2006 | Ramachandran et al. |
| 7,256,375 | B2 | 8/2007 | Oosterlaken |
| 7,414,224 | B2 | 8/2008 | Aderhold et al. |
| 7,648,579 | B2 | 1/2010 | Goodman et al. |
| 7,704,327 | B2 | 4/2010 | Waldhauer et al. |
| 8,287,650 | B2 | 10/2012 | Lee et al. |
| 2003/0186563 | A1 | 10/2003 | Kobayashi et al. |
| 2004/0052512 | A1 | 3/2004 | Aderhold et al. |
| 2005/0191044 | A1 | 9/2005 | Aderhold et al. |
| 2006/0223315 | A1* | 10/2006 | Yokota .............. H01L 21/02249 118/724 |
| 2007/0104470 | A1 | 5/2007 | Aderhold et al. |
| 2008/0064184 | A1 | 3/2008 | Lackner et al. |
| 2008/0085591 | A1 | 4/2008 | Gomez et al. |
| 2008/0141942 | A1 | 6/2008 | Brown et al. |
| 2008/0169282 | A1 | 7/2008 | Sorabji et al. |
| 2009/0103905 | A1 | 4/2009 | Tanino et al. |
| 2009/0255921 | A1 | 10/2009 | Ranish et al. |
| 2009/0274454 | A1 | 11/2009 | Aderhold et al. |
| 2010/0044974 | A1 | 2/2010 | Kenworthy et al. |
| 2011/0061810 | A1* | 3/2011 | Ganguly ............. H01L 21/0223 156/345.27 |
| 2011/0150764 | A1 | 6/2011 | Lee et al. |
| 2011/0159211 | A1 | 6/2011 | Du Bois et al. |
| 2011/0250764 | A1 | 10/2011 | Yokota et al. |
| 2012/0141946 | A1* | 6/2012 | Muller ..................... F23M 5/00 431/181 |
| 2012/0213500 | A1 | 8/2012 | Koelmel et al. |
| 2016/0370003 | A1* | 12/2016 | Chang ........................ C10J 3/20 |
| 2018/0174870 | A1 | 6/2018 | Yang et al. |
| 2020/0321195 | A1 | 10/2020 | Doba et al. |
| 2021/0040612 | A1 | 2/2021 | Hawrylchak et al. |
| 2022/0403511 | A1 | 12/2022 | Yamazaki et al. |

FOREIGN PATENT DOCUMENTS

| | | | |
|---|---|---|---|
| JP | 09-202969 | A | 8/1997 |
| JP | 2003-059852 | | 2/2003 |
| JP | 2006-093283 | A | 4/2006 |
| JP | 2009-016567 | A | 1/2009 |
| KR | 20110137775 | A | 12/2011 |
| KR | 10-2013-0023194 | A | 3/2013 |

OTHER PUBLICATIONS

International Search Report dated Jan. 16, 2014 for PCT/US2013/060002.

International Search Report dated Dec. 12, 2013 for PCT/US13/055167.

Office Action from South Korean Patent Application No. 10-2025-7034821, dated Jul. 30, 2026.

* cited by examiner

ORIFICE DRIVEN HYDROXYL COMBUSTION OXIDATION

BACKGROUND

Field

Embodiments of the present disclosure generally relate to a process chamber for processing a substrate, and related methods.

Description of the Related Art

In the processing of substrates, such as semiconducting substrates, the substrate is placed on a support in a process chamber and suitable processing conditions are maintained in the process chamber. For example, the substrate can be oxidized in a controlled oxidation process to chemically process the substrate. The substrate can be oxidized, for example, by an array of chemicals disposed above and/or below the substrate in the chamber. Oxidation processing can be used, for example, to oxidize silicon nitride to a silicon oxide or oxynitride.

It has been observed that variations in oxidation processes across the substrate can result in non-uniform processing of the substrate. Currently, many non-uniform oxidations occur at different substrate regions, e.g., proximal portions of a memory hole or distal portions of a memory hole, because of low pressure, oxygen radical requirements, e.g., less than 10 Torr. Unfortunately, high pressure oxidation processes have been largely unsuccessful due to oxidation radicals being quenched or decaying rapidly. The radicals from high pressure oxidation processes are formed and fail to adequately penetrate the memory holes of the substrate to ensure a uniform oxidation reaction. This is further complicated when using memory holes having high aspect ratios, in which the surface area continues to increase 10-20% for every node of the memory hole.

Accordingly, improved methods of and apparatuses for oxidation processes are needed.

SUMMARY

In an aspect, the disclosure provides a processing chamber. The processing chamber includes a substrate support. The processing chamber includes a plurality of orifices, including a first orifice and a plurality of second orifices. The first orifice is positioned along a first side of the chamber and oriented towards a first location of the chamber. The plurality of second orifices are positioned along a second side of the chamber and oriented towards the first location of the chamber. The plurality of second orifices is substantially perpendicular to the at least a first orifice. The processing chamber includes a controller. The controller is configured to heat the processing chamber, inject a first gas from the at least a first orifice, inject a second gas from the plurality of second orifices, and produce a radical as a function of the heat, the first gas, and the second gas.

In another aspect, the disclosure provides a method of orifice driven hydroxyl combustion oxidation. The method includes introducing, via a controller, a first gas using at least a first orifice positioned along a first side of the chamber and oriented towards a first location of the chamber into the processing chamber. A second gas is introduced, via the controller, into the processing chamber using a plurality of second orifices positioned along a second side of the chamber and oriented towards the first location. The plurality of second orifices are oriented substantially perpendicular to the at least a first orifice. A radical is produced as a function of the first gas and the second gas while heating the chamber.

In another aspect, the disclosure provides a computer readable medium. The computer readable medium is configured to introduce, via a controller, a first gas using at least a first orifice positioned along a first side of the chamber and oriented towards a first location of the chamber into the processing chamber. A second gas is introduced, via the controller, into the processing chamber using a plurality of second orifices positioned along a second side of the chamber and oriented towards the first location. The plurality of second orifices are oriented substantially perpendicular to the at least a first orifice. A radical is produced as a function of the first gas and the second gas while heating the chamber.

BRIEF DESCRIPTION OF THE DRAWINGS

So that the manner in which the above recited features of the present disclosure can be understood in detail, a more particular description of the disclosure, briefly summarized above, may be had by reference to embodiments, some of which are illustrated in the appended drawings. It is to be noted, however, that the appended drawings illustrate only exemplary embodiments and are therefore not to be considered limiting of scope, as the disclosure may admit to other equally effective embodiments.

FIG. 4A depicts an illustration of a substrate chamber having four fast orifices and a plurality of second orifices. FIG. 4B depicts an illustration of a substrate chamber having six first orifices and a plurality of second orifices.

FIG. 6A depicts a memory hole before oxidation. FIG. 6B depicts a memory hole during hydroxyl radical flow. FIG. 6C depicts a memory hole after hydroxyl radical combustion oxidation.

To facilitate understanding, identical reference numerals have been used, where possible, to designate identical elements that are common to the figures. It is contemplated that elements and features of one embodiment may be beneficially incorporated in other embodiments without further recitation.

DETAILED DESCRIPTION

The present disclosure provides a system for providing a high pressure oxidation process while maintaining conformality, throughput, and oxide quality. In certain aspects, the system may allow for increased oxygen radicals or increased hydroxide radicals to be formed and used to oxidize an outer layer of a memory hole.

In certain aspects, the system is capable of performing high pressure oxidation reactions because of the plurality of orifices or nozzles that promote fuel and oxidation combustion reactions. The orifices or nozzles may inject one or more reactive gases, such as hydrogen gas, oxygen gas, or an inert gas. The orifices or nozzles may provide a cross-flow with enough gas velocity to spread combustion reactants over the wafer or substrate promoting a uniform oxidation layer of $SiO_2$ such that a high pressure chamber may be utilized.

Processing Chamber

Figure 1:
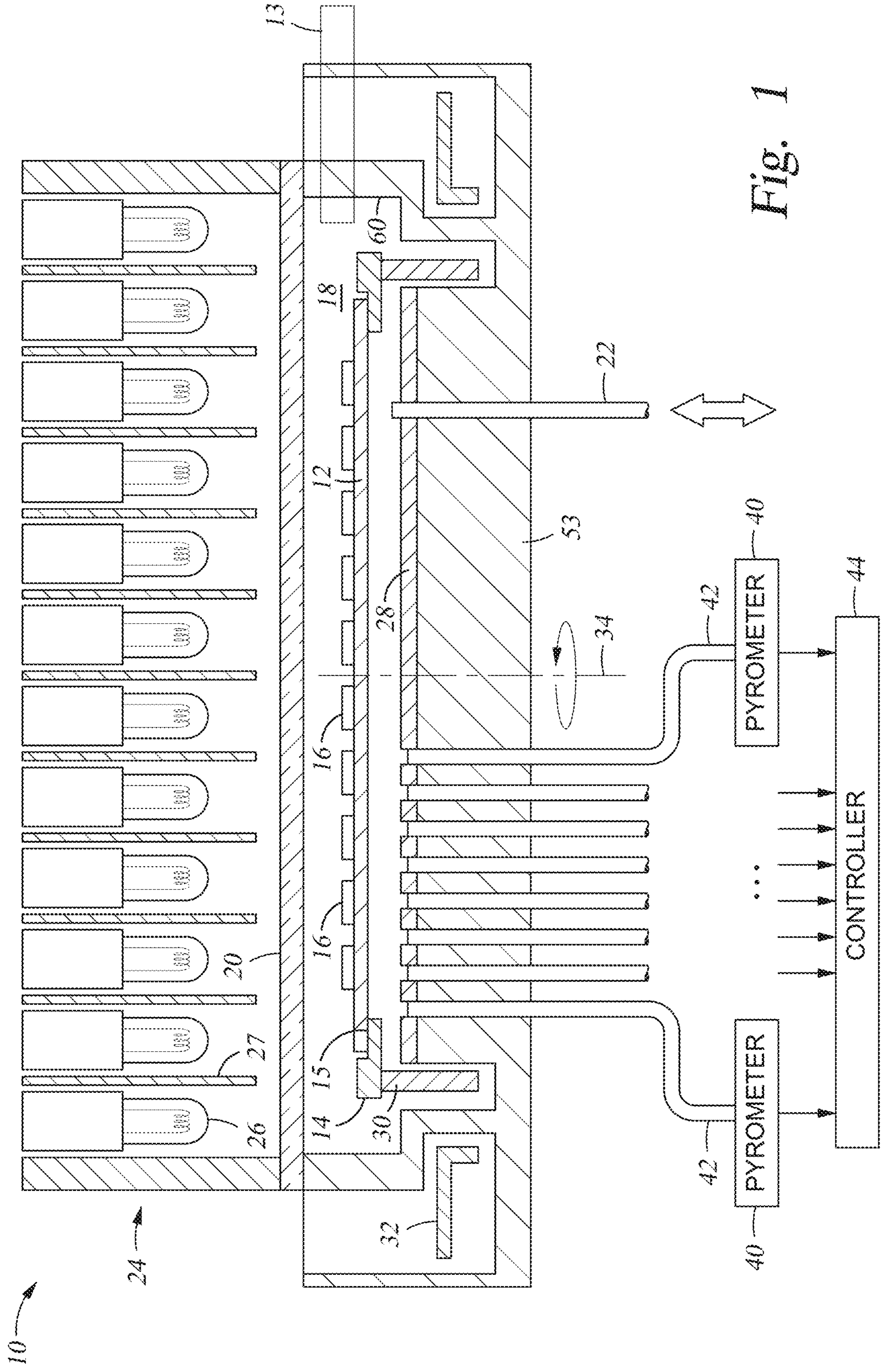
FIG. 1 schematically illustrates an exemplary rapid thermal processing chamber having a substrate support, according to embodiments of the disclosure.

FIG. 1 schematically represents a rapid thermal processing chamber 10. A substrate 12, for example, a semiconductor substrate such as a silicon substrate to be thermally processed is passed through the valve or access port 13 into the process area 18 of the processing chamber 10. The substrate 12 is supported on its periphery by an annular support ring 14. An edge lip 15 extends inward of the annular support ring 14 and contacts the peripheral edge of the substrate 12. The substrate may be oriented such that processed features 16 already formed in a front surface of the substrate 12 face upwardly toward a process area 18 defined on its upper side by a transparent quartz window 20. That is, the front surface of the substrate 12 is facing toward the array of lamps 26. The front surface of the substrate 12 with the processed featured formed thereon may face away from the array of lamps 26, i.e., facing towards the pyrometers 40. Contrary to the schematic illustration, the features 16 for the most part do not project substantial distances beyond the front surface of the substrate 12 but constitute patterning within and near the plane of the front surface.

A plurality of lift pins 22, such as three lift pins, may be raised and lowered to support the back side of the substrate 12 when the substrate is handed between a paddle or robot blade (not shown) bringing the substrate into the processing chamber and onto the support ring 14. A radiant heating apparatus 24 is positioned above the window 20 and configured to direct radiant energy toward the substrate 12 through the window 20. In the processing chamber 10, the radiant heating apparatus may include a large number, 409 being an exemplary number, of high-intensity tungsten-halogen lamps 26 positioned in respective reflective tubes 27 arranged in a hexagonal close-packed array above the window 20. The array of lamps 26 is sometimes referred to as the lamphead. The array of lamps 26 facilitate thermal processing of the substrate. However, it is contemplated that other radiant heating apparatus may be substituted. Generally, these involve resistive heating to quickly ramp up the temperature of the radiant source. Examples of suitable lamps include mercury vapor lamps having an envelope of glass or silica surrounding a filament and flash lamps which comprise an envelope of glass or silica surrounding a gas such as xenon, which provides a heat source when the gas is energized. As used herein, the term lamp is intended to cover lamps including an envelope that surrounds a heat source. The "heat source" of a lamp refers to a material or element that can increase the temperature of the substrate, for example, a filament or gas that can be energized, or a solid region of a material that injects radiation such as a LED or solid state lasers and laser diodes.

As used herein, rapid thermal processing or RTP refers to an apparatus or a process capable of uniformly heating a substrate at rates of about 50° C./second and higher, for example, at rates of about 100° C./second to 150° C./second, and about 200° C./second to 400° C./second. The temperature may be uniformly heated to a temperature range of about 700° C. to about 1,000° C., e.g., about 700° C., about 800° C., about 900° C., about 1,000° C., or the like. The temperature may be uniformly heated to about 800° C. Typical ramp-down (cooling) rates in RTP chambers are in the range of about 80° C./second to 150° C./second. Some processes performed in RTP chambers utilize variations in temperature across the substrate of less than a few degrees Celsius. An RTP chamber with such a heating control system may anneal a sample in less than 5 seconds, for example, less than 1 second, and in some embodiments, milliseconds.

Controlling the temperature across the substrate 12 to a closely defined temperature across the substrate 12 improves process uniformity. One passive means of improving the uniformity may include a reflector 28 disposed beneath the substrate 12. The reflector 28 extends parallel to and over an area greater than the substrate 12. The reflector 28 efficiently reflects heat radiation emitted from the substrate 12 back toward the substrate 12 to enhance the apparent emissivity of the substrate 12. The spacing between the substrate 12 and the reflector 28 may be between about 3 mm to 9 mm, and the aspect ratio of the width to the thickness of the cavity is advantageously greater than 20. The top of reflector 28, which may be made of aluminum and has a highly reflective surface coating or multi-layer dielectric interference mirror, and the back side of the substrate 12 form a reflecting cavity for enhancing the effective emissivity of the substrate, thereby improving the accuracy of temperature measurement. In certain embodiments, the reflector 28 may have a more irregular surface or have a black or other colored surface to more closely resemble a black-body wall. The reflector 28 may be deposited on a second wall 53, which is a water-cooled base 53 made of metal to heat sink excess radiation from the substrate, especially during cool down. Accordingly, the process area of the processing chamber 10 has at least two substantially parallel walls, of which a first is a window 20, made of a material being transparent to radiation such as quartz, and the second wall 53 which is substantially parallel to the first wall and made of metal significantly not transparent.

One way of improving the uniformity includes supporting the support ring 14 on a rotatable cylinder 30 that is magnetically coupled to a rotatable flange 32 positioned outside the processing chamber 10. A motor (not shown) rotates the flange 32 and hence rotates the substrate about its center 34, which is also the centerline of the generally symmetric chamber. Alternatively, the bottom of the rotatable cylinder 30 may be magnetically levitated cylinder held in place by magnets disposed in the rotatable flange 32 and rotated by rotating magnetic field in the rotatable flange 32 from coils in the rotatable flange 32.

Another way of improving the uniformity divides the lamps 26 into zones arranged generally ring-like about the central axis 34. Control circuitry varies the voltage delivered to the lamps 26 in the different zones to thereby tailor the radial distribution of radiant energy. Dynamic control of the zoned heating is affected by, one or a plurality of pyrometers 40 coupled through one or more optical light pipes 42 positioned to face the back side of the substrate 12 through apertures in the reflector 28 to measure the temperature across a radius of the rotating substrate 12. The light pipes 42 may be formed of various structures including sapphire, metal, and silica fiber. A computerized controller 44 receives the outputs of the pyrometers 40 and accordingly controls the voltages supplied to the different rings of lamps 26 to thereby dynamically control the radiant heating intensity and pattern during the processing. Pyrometers generally measure light intensity in a narrow wavelength bandwidth of, for example, 40 nm in a range between about 700 nm to 1000 nm. The controller 44 or other instrumentation converts the light intensity to a temperature through the well-known Planck distribution of the spectral distribution of light intensity radiating from a black-body held at that temperature. Pyrometry, however, is affected by the emissivity of the portion of the substrate 12 being scanned. Emissivity $\epsilon$ can vary between 1 for a black body to 0 for a perfect reflector and thus is an inverse measure of the reflectivity $R=1-\epsilon$ of the substrate back side. While the back surface of a substrate is typically uniform so that uniform emissivity is expected, the backside composition may vary depending upon prior processing. The pyrometry can be improved by further including an emissometer to optically probe the substrate to measure the emissivity or reflectance of the portion of the substrate the emissometer is facing in the relevant wavelength range and the control algorithm within the controller 44 to include the measured emissivity.

Substrate Support

Figure 2:
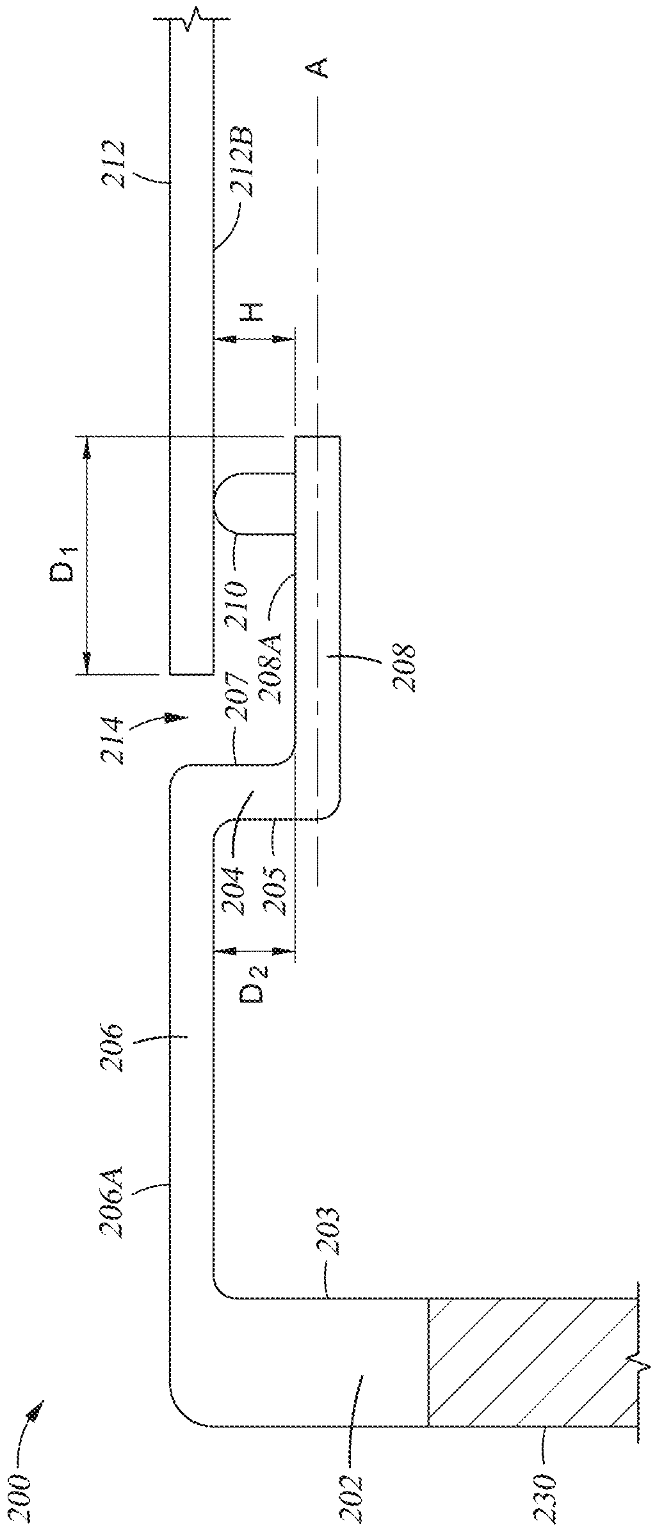
FIG. 2 is a schematic illustrations of cross-sectional views of a support ring, according to embodiments of the disclosure.

FIG. 2 is a schematic cross-sectional side view of a support ring 200 that may be used in place of the support ring 14 of FIG. 1 according to one embodiment. The support ring 200 illustrated in FIG. 2 may be disposed within a processing chamber, for example a rapid thermal processing chamber 10 shown in FIG. 1, and extend radially inwardly along the inner circumferential surfaces 60 of the processing chamber 10. The support ring may be a continuous ring body (or may be discrete ring-like bodies in some embodiments) which substantially surrounds a periphery of the substrate.

In one embodiment shown in FIG. 2, the support ring 200 generally includes an annular body having a central opening. The support ring 200 has an outer ring 202 and an inner ring 204. The outer ring 202 connects to the inner ring 204 through a flat portion 206 which extends radially inwardly from an inner perimeter 203 of the outer ring 202 to an outer perimeter 205 of the inner ring 204. The outer ring 202 may be supported by a cylinder 230, such as the rotatable cylinder 30 shown in FIG. 1. For a top-heating type configuration, the rotatable cylinder 230 may contact the support ring 200 just inward from the outer ring 202. That is, the bottom surface of the outer ring 202 is opposite to the top surface 206*a* of the flat portion 206 to prevent light leakage and provide mechanical stability. The support ring 200 further includes an edge lip 208 which extends radially inwardly from an inner perimeter 207 of the inner ring 204 to form a supporting ledge to support the back surface 212*b* of the substrate 212 near a peripheral edge of the substrate 212.

The substrate support 210 may be a continuous ring body disposed around the circumference of an edge lip 208. A substrate support 210 with a continuous ring body may be advantageous regardless of the configuration of the heating lamps since the continuous ring body prevents possible light leakage problem by blocking light of source radiation in the process chamber from reaching the pyrometer that is disposed opposing the source radiation. In addition, a continuous ring body is believed to provide a better and stable support for the substrate 212 since the substrate 212 is rotatably supported by the substrate support 210 during the heating process.

The substrate support 210 may be formed on the top surface 208*a* of the edge lip 208 using a laser machining technique or any suitable technique. The substrate support 210 may be any suitable shape such as rectangular, rhombus, square, hemispherical, hexagonal, triangular protrusions or mixtures of differently shaped protrusions. The substrate support 210 may be any shape having a reduced contact surface with the substrate. For example, the substrate support 210 may have a hemispherical top surface. Hemispherical top surface may be advantageous in terms of effective thermal mass reduction since the hemispherical top surface is able to further reduce the surface contact area between the edge lip and the substrate by turning the surface contact into a continuous line contact or discrete line contacts.

In this disclosure, the "line contact" may refer to a line with a radial width less than about 500 μm, for example, between about 5 μm and about 200 μm, such as 50 μm. The substrate support 210 supports the substrate with minimal contact area and minimal heat transfer between the edge lip 208 and the substrate 212. For a nominal 12 inch (300 mm) substrate, the edge lip 208 to substrate area of contact may be less than about 15 $cm^2$ or less, for example about 5 $cm^2$ or less, such as about 1 $cm^2$ to about 3 $cm^2$. It is contemplated that the width of the line that is in physical contact with the back surface of the substrate may vary depending upon the shape of the substrate support 210. It is also contemplated that the shape and/or dimension of the substrate support 210 may vary so long as the substrate 212 is securely supported with minimized contact area between the substrate support 210 and the back surface 212*b* of the substrate 212. In one example, the dimensions of the substrate support 210 may vary over broad limits between about 0.1 mm and about 10 mm, such as between about 0.2 mm and about 2 mm, for example about 1 mm in width.

Converting surface contact into continuous line contact substantially reduces the contact area available for conductive transfer of heat between the edge lip 208 of the support ring 200 and the substrate 212, thereby eliminating or minimizing excessive temperature gradients in the substrate during thermal processing even at a reduced pressure of about 50 Torr to about 200 Torr, e.g., about 50 Torr, about 60 Torr, about 70 Torr, about 80 Torr, about 90 Torr, about 100 Torr, about 110 Torr, about 120 Torr, about 130 Torr, about 140 Torr, about 150 Torr, about 160 Torr, about 170 Torr, about 180 Torr, about 190 Torr, about 200 Torr, or the like. Reducing the surface contact area between the substrate 212 and the support ring 200 would also allow for better management of the thermal mass discontinuity caused by the overlap of the substrate 212 and the edge lip 208. Therefore, the distortion of the thermal gradient generated by the heat loss around the edge of the substrate is reduced, resulting in an improved temperature profile of across the substrate with a minimum edge temperature gradient. Reduced contact area between the edge lip 208 and the substrate 212 further reduces possible particle contamination in the processing chamber. For top radiant heating arrangement as shown in FIG. 1, the radiation from the radiation heat source can be tailored just to heat up the substrate without worrying too much about the thermal mass discontinuity in the overlap region since the substrate is thermally disconnected from the edge lip 208 through the substrate supports 210. Therefore, the inventive substrate supports may translate to faster attainable heating ramp rates or reduced spike power situation.

The substrate support 210 may be made of a material that is transparent to radiation in the frequency range used for temperature measurements of the substrate. In one example, the substrate support 210 is made of silicon carbide. Other materials, such as silicon carbide alloys, ceramics, or high temperature materials such as amorphous silica, $Al_2O_2$, $ZrO_2$, $Si_3N_4$, or similar material, are also contemplated. The substrate support 210 may be optionally coated with silicon dioxide ($SiO_2$) or any other suitable material to prevent Si—Si bonding with the back surface 212*b* of the substrate 212 at high temperatures which can lead to potential substrate sticking to the substrate support. The support ring 200 may be made of a material similar to the substrate so as to minimize absorptivity/reflectance mismatch between the substrate and the support ring. In one example, the support ring 200 is made of silicon carbide. In certain embodiments, the support ring 200 may be optionally coated with a layer of polycrystalline silicon (polysilicon) to render the support ring opaque to radiation in a frequency range used for a temperature measurement of a substrate in a thermal processing chamber. In such a case, the thickness of a polysilicon layer may vary ranging between about 20 μm and about 50 μm, depending upon the thickness of the support ring 200, or depending on opacity of SiC, for example, that is used in the support ring 200.

Processing chamber 10 operates at a pressure of about 50 Torr to about 250 Torr. Processing chamber 10 includes a lamp heating, pyrometer temperature control, or other substrate heating technique to heat a substrate in the chamber, e.g., a resistive heater or an inductive heater that rotates around the substrate to provide uniform heating.

Orifice

Figure 3:
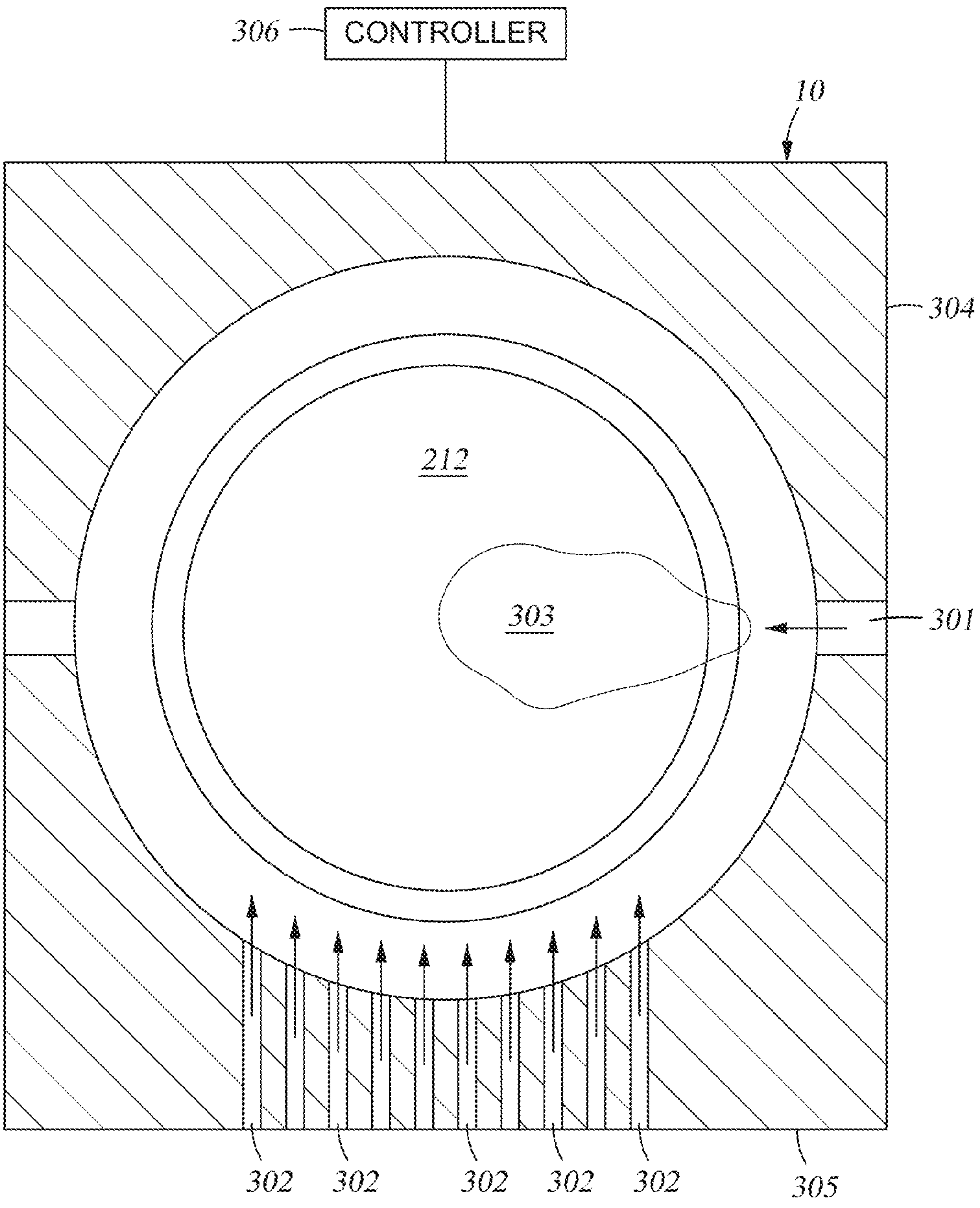
FIG. 3 depicts an illustration of a process chamber having a plurality of first orifices and a plurality of second orifices, according to embodiments of the disclosure.

Now referring to FIG. 3, process chamber 10 may have an orifice. The process chamber 10 may have a first orifice 301 and a plurality of second orifices 302 extending towards the substrate 212. An orifice may have a diameter of about 30 mil to about 150 mil, e.g., about 30 mil, about 40 mil, about 50 mil, about 60 mil, about 70 mil, about 80 mil, about 90 mil, about 100 mil, about 110 mil, about 120 mil, about 130 mil, about 140 mil, about 150 mil, or the like.

The first orifice 301 or the plurality of second orifices 302 are configured to inject one or more gases. The one or more gases may include reactive gases, e.g., $H_2$, $O_2$, or the like, and/or inert gases, e.g., $N_2$, He, Ar, or the like, towards the substrate 212, as shown in FIG. 3. For example, and without limitation, the one or more gases may be $O_2$ with an inert gas, such as argon or nitrogen. As a further non-limiting example, the one or more gases may be $H_2$ with an inert gas, such as argon or nitrogen. The one or more gases may include a combination of reactive gases, e.g., $H_2$ and $O_2$, or the like, and inert gases, e.g., $N_2$, He, Ar, or the like, towards the substrate 212, as shown in FIG. 3. For example, and without limitation, the one or more gases may be a combination of a pre-mixed amount of $H_2$ and $O_2$ with an inert gas, such as argon or nitrogen. As a further non-limiting example, $O_2$ is injected by the first orifice 301 and $H_2$ is injected by the plurality of second orifices 302.

The first orifice 301 is positioned along a first side 304 of the processing chamber 10. The first orifice 301 may be positioned to inject one or more gases substantially perpendicular from the first side 304 of the processing chamber 10, as shown in FIG. 3. The plurality of second orifices 302 may be positioned along a second side 305 of the processing chamber 10, in which the second side intersects the first side substantially perpendicularly, as shown in FIG. 3. The plurality of second orifices 302 are positioned to inject one or more gases substantially perpendicular from the second side 305 of the processing chamber 10, as shown in FIG. 3.

Figure 4A:
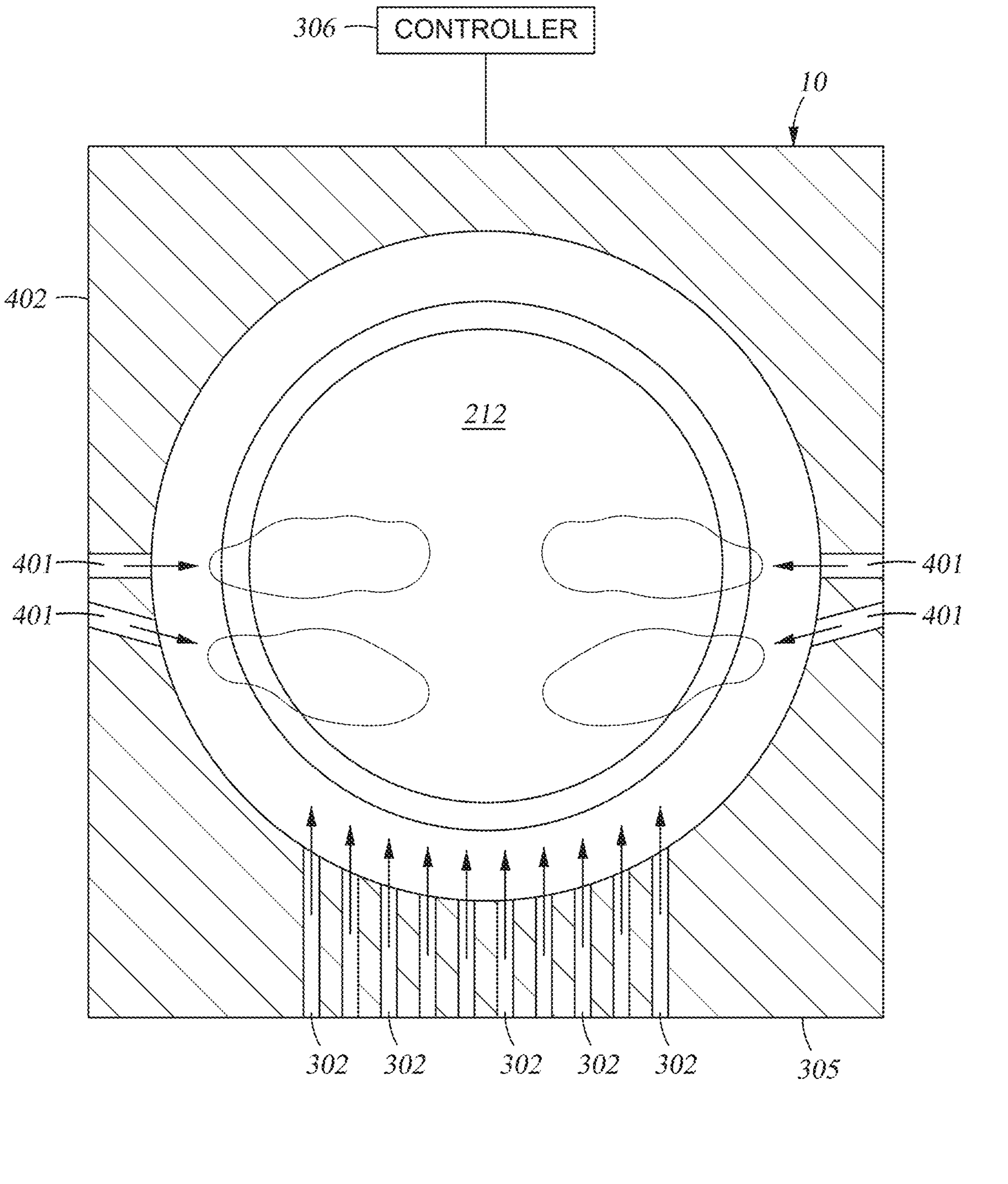
FIGS. 4A and 4B depict an illustration of a process chamber having a plurality of first orifices and a plurality of second orifices, according to embodiments of the disclosure.
Figure 4B:
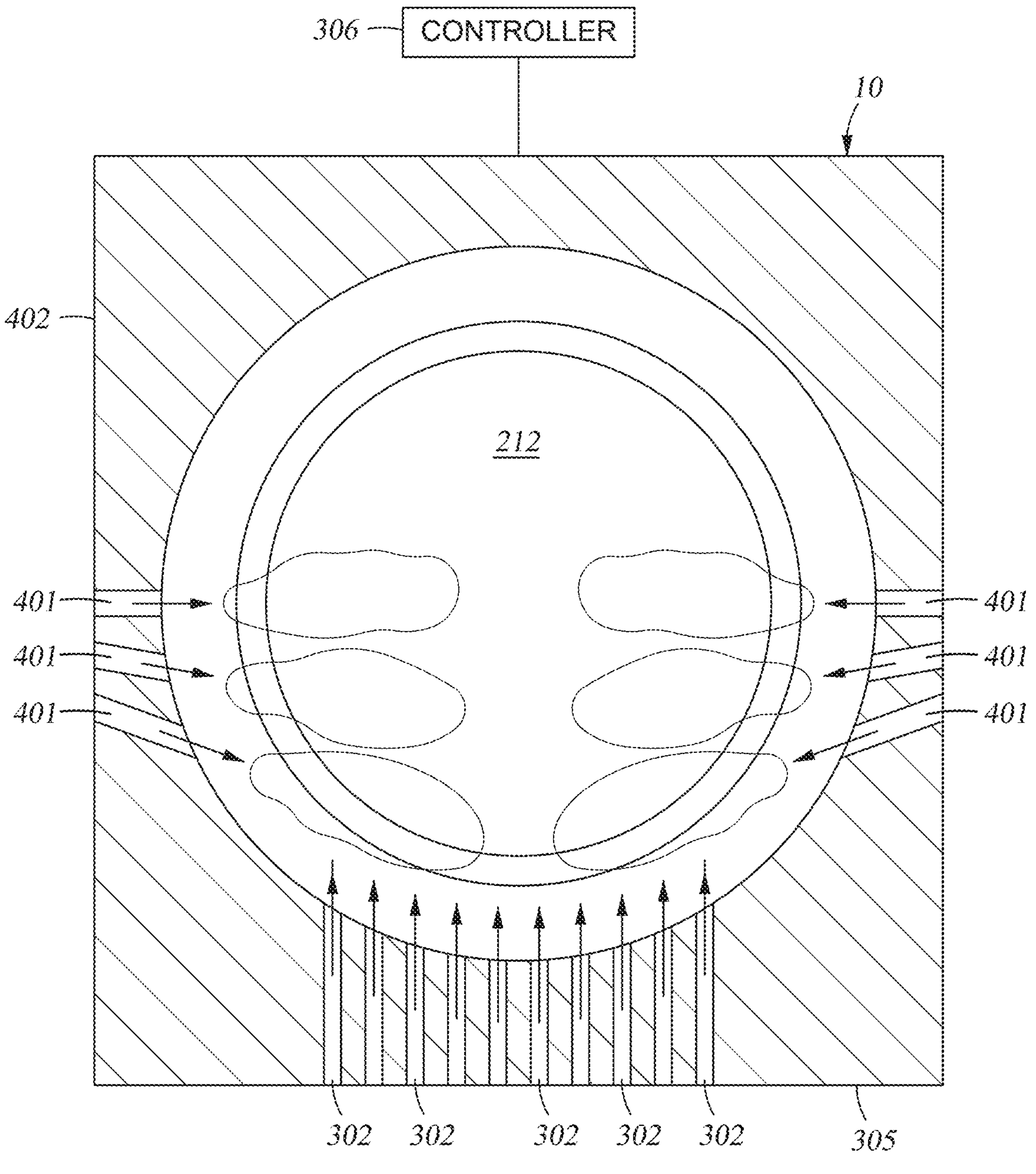

The processing chamber 10 may include a plurality of first orifices 401, as shown in FIGS. 4A and 4B. The plurality of first orifices 401 may be positioned along the first side 304 of process chamber 10 or a third side 402 of process chamber 10, in which the first side 304 of the process chamber and the third side 402 are substantially parallel to each other, as shown in FIGS. 4A and 4B. In another embodiment, the plurality of first orifices 401 may be positioned along the first side 304 of process chamber 10 and a third side 402 of process chamber 10, in which the first side 304 of the process chamber and the third side 402 are substantially parallel to each other, as shown in FIGS. 4A and 4B. The plurality of first orifices 401 may range from about 1 to about 15 orifices, e.g., about 3 orifices to about 8 orifices, such as about 1 orifice, about 2 orifices, about 3 orifices, about 4 orifices, about 5 orifices, about 6 orifices, about 7 orifices, about 8 orifices, about 9 orifices, about 11 orifices, about 12 orifices, about 13 orifices, about 14 orifices, about 15 orifices, or the like.

The plurality of second orifices 302 may be positioned along the second side of process chamber, in which the second side is perpendicular to the first side and the third side, as shown in FIG. 3. The plurality of second orifices 302 may range from about 1 to about 15 orifices, e.g., about 3 orifices to about 8 orifices, such as about 1 orifice, about 2 orifices, about 3 orifices, about 4 orifices, about 5 orifices, about 6 orifices, about 7 orifices, about 8 orifices, about 9 orifices, about 11 orifices, about 12 orifices, about 13 orifices, about 14 orifices, about 15 orifices, or the like.

The placement and orientation of the orifices facilitates improved mixing of process gases over the substrate 212, while reducing undesired upstream mixing of process gas, such as mixing that can occur when using a single gas inlet or when using multiple gas inlets on the same side of the process chamber. The improved gas introduction of the present disclosure provides for improved radical generation and sustainability in relatively higher pressure processes, thus improving substrate processing. In particular, oxidation of memory hole sidewalls is improved through increased conformity/uniformity.

In some examples, the process chamber 10 may include four first orifices and a plurality of second orifices, e.g., about 1 to about 10, such as about 10, as shown in FIG. 4A. The process chamber may include six first orifices and a plurality of second orifices, e.g., about 1 to about 10, such as about 10, as shown in FIG. 4B. Improved coverage and reaction efficiency between the hydrogen molecular gas and the oxygen molecular gas occurs due to the number of first orifices and the number of second orifices. The improved reaction efficiency results in uniform oxidation of the substrate memory hole, described below.

Substrate Memory Hole

The substrate 212 may include a plurality of memory holes. A "memory hole," as used herein, refers to a vertical channel extending two or more physical levels of the substrate 212. The memory holes may include a vertical trench that is formed to divide one or more memory hole structures into two or more vertical "NOT AND" (NAND) strings. A memory hole may include a vertical channel extending 32, 48, 64, 96, 112, or more, layers of a substrate 212.

Figure 6C:
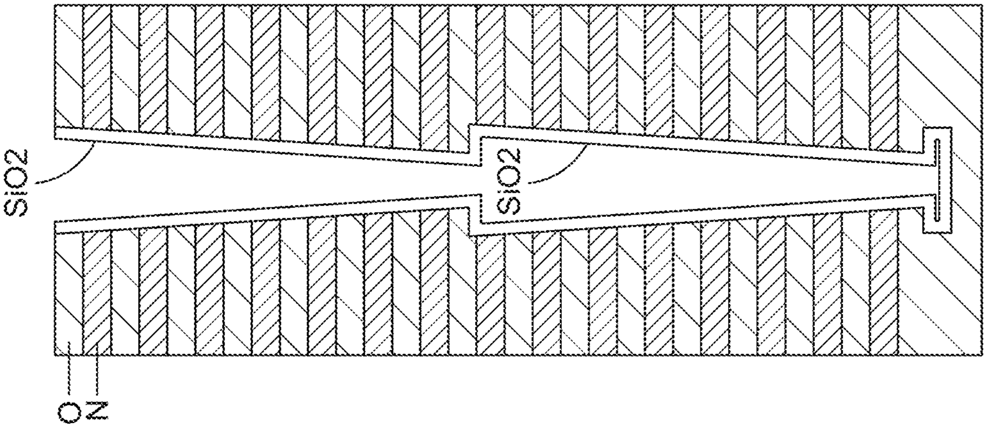
FIGS. 6A-6C depicts diagrammatic representation of memory hole of a substrate, according to embodiments of the disclosure.
Figure 6B:
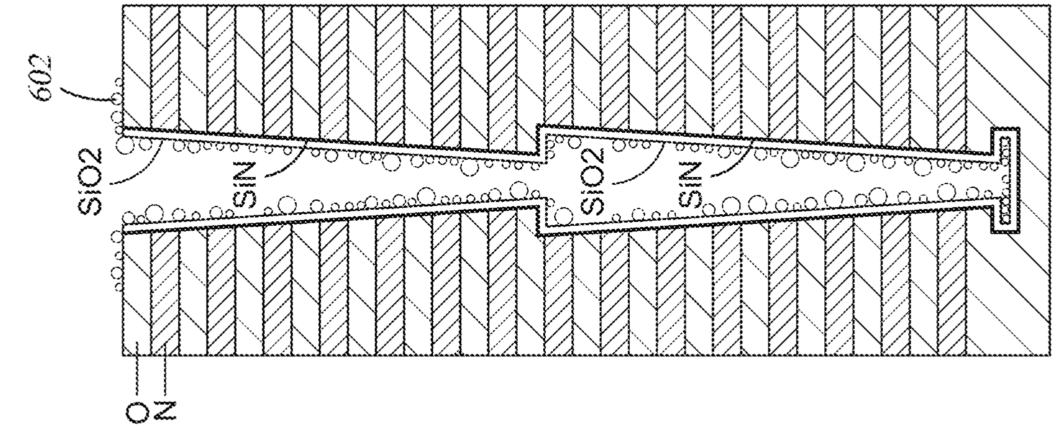
Figure 6A:
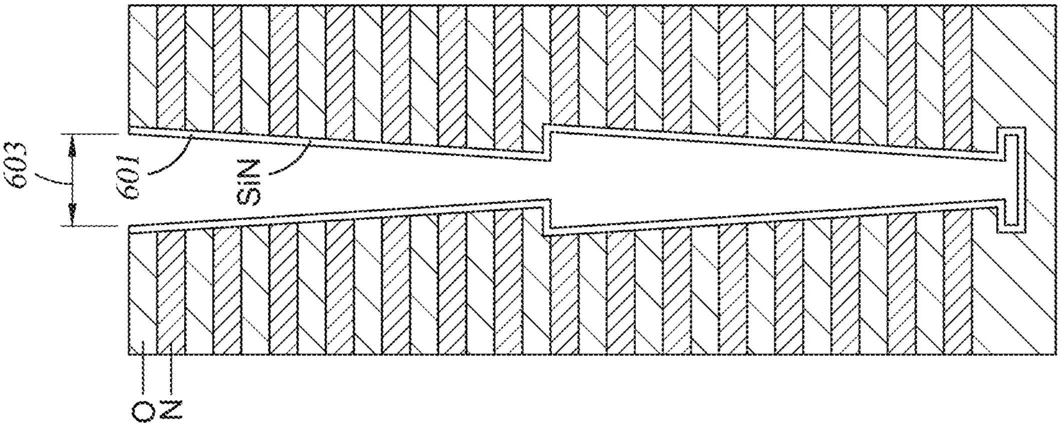

The plurality of memory holes have a substantially vertical and uniform vertical trench. The plurality of memory holes may comprise one or more vertical features, e.g., necking, clogging, bowing, striations, tapered profiles, underlayer recesses, distortions, tiltings, twistings, or the like. The plurality of memory holes has a first vertical trench comprising a tapered profile extending 16 layers, in which a second vertical trench comprising a tapered profile extends beyond the first vertical trench, creating a shelf, as shown in FIG. 6A.

The plurality of memory holes includes an outer layer 601 within the vertical trench. The outer layer 601 may include a layer of one or more silica substrates, e.g., silicon nitride, silicon dioxide, or the like. For example, and without limitation, the outer layer 601 is a silicon nitride layer. For example, and without limitation, the outer layer 601 is a silicon dioxide layer.

Controller

The processing chamber 10 includes a controller 306. Each controller may be a local controller associated with, and programmed to control, a corresponding single orifice or a corresponding group of orifices. For example, and without limitation, each local controller 306 may control a single first orifice 301. As a further non-limiting example, the controller 306 may be configured to control the plurality of second orifices 302. In an example, the controller 306 includes an application-specific integrated circuit (ASIC). Each controller 306 may be integrated into the processing chamber 10. Each controller 306 may be coupled to a PCB separate from the processing chamber 10. The controller 306 may include an electromagnetic shield. To inhibit corrosion, it is contemplated that surfaces of the controller 306 may be coated with one or more suitable materials. Examples of coating materials include silicon carbide, parylenes, hydrophobic anti-stiction films applied by molecular vapor deposition, ceramics, aluminum oxides (such as $Al_2O_3$), yttrium oxides (such as $Y_2O_3$), silicon oxides (such as $SiO_x$), titanium oxides (such as $TiO_2$), and the like.

The controller 306 receives commands from a master controller via a PCB, or is itself a master controller. It is contemplated that the commands may be in the form of a signal that is addressed to correspond with a specific device or orifice, such as a specific orifice of the processing chamber. Each controller 306 is programmed to recognize command signals addressed to correspond with devices under the purview of controller 306, and controls the orifices according to the commands received. For example, and without limitation, each controller 306 is programmed to ignore command signals that are not addressed to correspond with any of the orifices under the purview of controller 306.

Each orifice may be independently addressable via a corresponding controller 306, such that the operation of each orifice can be controlled without changing the operating status of any other orifices in the processing chamber 10. Each orifice may be assigned to one or more groups of orifices, and each group of orifices is independently addressable via one or more corresponding controllers 306. In such embodiments, the operation of each orifice within a defined group can be controlled without changing the operating status of any other orifice that is not within the defined group.

Oxidation Process

Figure 5:
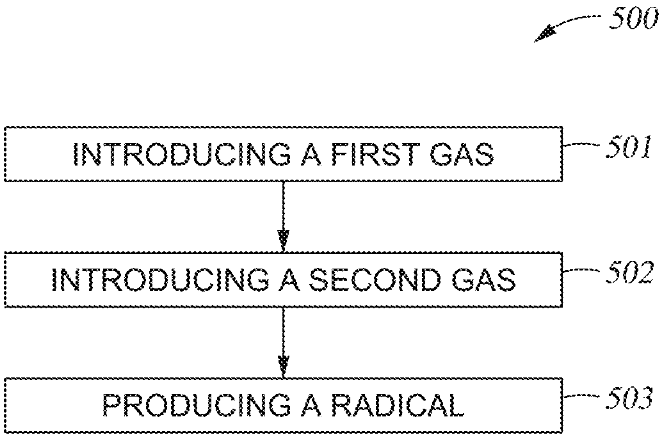
FIG. 5 is a diagrammatic representation of a method of orifice driven hydroxyl combustion oxidation, according to embodiments of the disclosure.

Now referring to FIG. 5, a method of hydroxyl combustion oxidation 500 includes introducing, via a controller instruction, a first gas into a processing chamber through a first orifice in operation 501. The processing chamber may have a substrate disposed therein. The first gas 303 may include a reactive gas, e.g., $H_2$, $O_2$, or the like, and/or an inert gas, e.g., $N_2$, He, Ar, or the like. In one example, the first gas 303 includes $O_2$ and the second gas includes $H_2$.

The first gas 303 is injected from a first orifice 301 via the controller 306. The first orifice 301 may inject the first gas 303 towards the substrate 212 at a volumetric flow rate of about 5 sim to about 40 slm, e.g., about 5 slm, about 6, slm, about 7 slm, about 8 slm, about 9 sim, about 10 sim, about 11 sim, about 12 slm, about 13 slm, about 14 slm, about 15 slm, about 16 sim, about 17 slm, about 18 slm, about 19 slm, about 20 slm, about 21 slm, about 22 slm, about 23 slm, about 24 slm, about 25 slm, about 26 slm, about 27 slm, about 28 slm, about 29 slm, about 30 slm, about 31 slm, about 32 slm, about 33 sim, about 34 slm, about 35 sim, about 36 slm, about 37 slm, about 38 slm, about 39 slm, about 40 slm or the like. The first orifice 301 may inject a reactive gas of $O_2$ at 8 to 11 slm and an inert gas of $N_2$ at 35-45 slm.

The first gas 303 may be injected from the first orifice 301 towards the first location at a gas velocity of about 1 m/s to about 20 m/s, e.g., about 1 m/s, about 2 m/s, about 3 m/s, about 4 m/s, about 5 m/s, about 6 m/s, about 7 m/s, about 8 m/s, about 9 m/s, about 10 m/s, about 11 m/s, about 12 m/s, about 13 m/s, about 14 m/s, about 15 m/s, about 16 m/s, about 17 m/s, about 18 m/s, about 19 m/s, about 20 m/s, or the like. The gas velocity facilitates reduced flame backflow due to the velocity exceeding a flame velocity. The first location includes a central opening of the chamber, an edge of the substrate support, or a location equal in between the central opening and the edge of the substrate support, e.g., half a radius of the processing chamber. The first gas 303 may be injected from the first orifice towards the substrate 212 with enough gas velocity to spread the gases over the substrate without concern of flame velocity extending back through the orifice. For example, the first orifice 301 may inject the one or more gases towards the substrate such that the flow exceeds a flame velocity, which is about 2 m/s to about 10 m/s.

The method 500 includes introducing a second gas, via a controller instruction, into the processing chamber using a plurality of second orifices 502. The plurality of second orifices 502 allows for enhanced efficiency of an oxidation reaction between $O_2$ and $H_2$ due to the volume and spreading of $H_2$ injected. The second gas may include a reactive gas, e.g., $H_2$, $O_2$, or the like, and/or an inert gas, e.g., $N_2$, He, Ar, or the like.

The second gas is injected from the second orifice 302 by instruction of the controller 306. The second orifice 302 may inject the second gas towards the substrate 212 at a volumetric flow rate of about 5 slm to about 40 slm, e.g., about 5 slm, about 6, slm, about 7 slm, about 8 slm, about 9 sim, about 10 sim, about 11 slm, about 12 slm, about 13 slm, about 14 slm, about 15 slm, about 16 slm, about 17 slm, about 18 slm, about 19 slm, about 20 slm, about 21 slm, about 22 slm, about 23 slm, about 24 slm, about 25 sim, about 26 sim, about 27 slm, about 28 slm, about 29 slm, about 30 slm, about 31 slm, about 32 slm, about 33 slm, about 34 slm, about 35 slm, about 36 slm, about 37 slm, about 38 slm, about 39 slm, about 40 slm or the like. The plurality of second orifices 302 may inject a reactive gas of $H_2$ at 20-24 slm and an inert gas of $N_2$ at 15-25 slm, for a 300 mm diameter substrate.

The second gas may be injected from the second orifice 302 towards the first location at a gas velocity of about 1 m/s to about 20 m/s, e.g., about 1 m/s, about 2 m/s, about 3 m/s, about 4 m/s, about 5 m/s, about 6 m/s, about 7 m/s, about 8 m/s, about 9 m/s, about 10 m/s, about 11 m/s, about 12 m/s, about 13 m/s, about 14 m/s, about 15 m/s, about 16 m/s, about 17 m/s, about 18 m/s, about 19 m/s, about 20 m/s, or the like. The gas velocity facilitates enhanced processing due to the velocity exceeding a flame velocity. The second gas is injected from the plurality of second orifices towards the substrate 212 with enough gas velocity to spread the gases over the substrate while mitigating flame backflow into the orifice. For example, the plurality of second gases may inject the one or more gases towards the substrate such that the flow exceeds a flame velocity, which is about 2 m/s to about 10 m/s.

The method 500 includes injecting the first gas 303 and the second gas while rotating the substrate support on the rotatable cylinder 30, described above, to produce a radical in operation 503. The method 500 includes injecting the first gas 303 and the second gas while the pressure of the processing chamber is about 50 Torr to about 200 Torr. For example, injecting the first gas 303 and the second gas may occur while the pressure of the processing chamber is at a reduced pressure of about 50 Torr to about 200 Torr, e.g., about 50 Torr, about 60 Torr, about 70 Torr, about 80 Torr, about 90 Torr, about 100 Torr, about 110 Torr, about 120 Torr, about 130 Torr, about 140 Torr, about 150 Torr, about 160 Torr, about 170 Torr, about 180 Torr, about 190 Torr, about 200 Torr, or the like. Conventionally, pressure such as these quench radicals before sufficient processing can occur. However, the gas injection scheme described herein facilitates improved radical longevity so that memory hole processing can occur. Methods and hardware described herein allow relatively large memory holes to be processes while maintaining conformity and/or uniformity above 95 percent, such as 99 percent or greater. In addition, since the hydroxyl radicals are formed in situ without the use of plasma, relatively higher pressures can be used (improving processing uniformity) which are otherwise unusable in due to radical quenching that occurs during plasma processing.

The method of hydroxyl combustion oxidation 500 includes producing a radical as a function of the first gas and the second gas while in the presence of heat. Producing a radical may include producing a hydroxyl radical as a function of a reaction between the first gas 303 and the second gas in the presence of heat. The radical is produced within the processing volume of the process chamber, over the substrate, and in the absence of a plasma or plasma source. For example, the hydroxyl radical may be formed as a function of reacting a first gas of oxygen and nitrogen with a second gas of hydrogen and nitrogen while heating. This allows for greater control of reactants compared to those requiring additional elements, e.g., plasma, when forming a hydroxyl radical. Additionally, this allows for more precision when oxidizing an features of a substrate, while reducing flame backflow. As a further non-limiting example, the hydroxyl radical may be formed as a function of reacting a first gas of oxygen and argon with a second gas of hydrogen and argon while heating. The reaction of the first gas 303 and the second gas may result in about 5% to about 20% of products being hydroxyl radicals, e.g., about 5%, about 6%, about 7%, about 8%, about 9%, about 10%, about 11%, about 12%, about 13%, about 14%, about 15%, about 16%, about 17%, about 18%, about 19%, about 20%, or the like. A reaction of the first gas 303 and the second gas may produce a hydroxide radical in processing chamber 10 when hydrogen gas is more than 50 mol % or vol % present in a $H_2$:$O_2$ mixture. For example, a hydroxide radical may be formed when hydrogen gas of a $H_2$:$O_2$ mixture is between 50 mol % or vol % and 80 mol % or vol %.

Once the radical is produced, an outer layer 601 (e.g., sidewall) of a memory hole of the substrate 503 can be oxidized thereby. Oxidizing the outer layer 601 includes oxidizing a silicon nitride layer to a silicon dioxide layer, as shown in FIGS. 6A-6C. A hydroxyl radical 602 may be produced via a reaction between the first gas 303 and the second gas, in which the hydroxyl radical flows into a memory hole 603 of the substrate 212, as shown in FIG. 6A. The hydroxyl radical 602 may flow into the memory hole 603 to provide good conformality, as shown in FIG. 6B. For example, the hydroxyl radical may flow into the memory hole to provide 99% conformality on 200:1 AR in a high partial pressure oxidant 100 Torr processing chamber. The hydroxyl radical 602 reacts with the silicon nitride outer layer 601, oxidizing the outer layer 601 to silicon dioxide, as shown in FIG. 6C.

Figure 7:
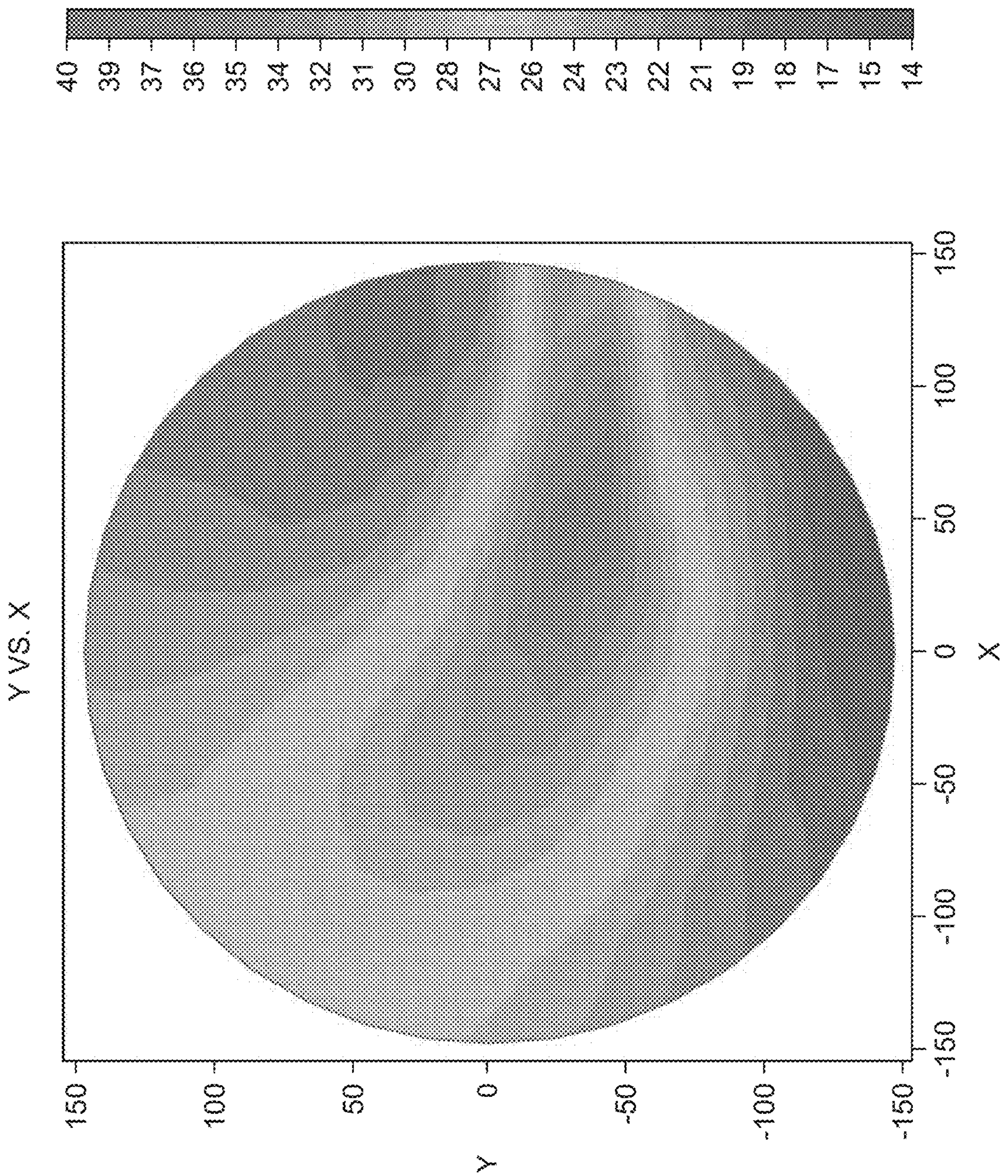
FIG. 7 depicts a plume spectra of a radical oxidation on substrate, according to embodiments of the disclosure.

The oxidation of the outer layer 601 may produce a deposition profile 600, as shown in FIG. 7. The deposition profile 600 may denote a thickness of oxidation of about 10 Å to about 100 Å of the outer layer 601, such as 10 Å to about 80 Å, such as about 10 Å to about 50 Å, such as about 10 Å to about 30 Å. However, other thicknesses of oxidation are envisioned. The thickness of oxidation of the outer layer 601 may be proportional to the amount of hydroxyl radical produced via the reaction between the first gas 303 and the second gas. The thickness of oxidation of the outer layer 601 may be equal to the amount of hydroxyl radical produced via the reaction between the first gas 303 and the second gas.

EXAMPLES

Example 1

A substrate was prepared using the processing chamber described herein. The temperature of the processing chamber was 800° C. The pressure was 90 Torr. The partial pressure of $H_2$ was 21.66 Torr and the partial pressure of $O_2$ was 9.26 Torr (~10 times radical oxidation). The plurality of second orifices injected 22 slm $H_2$ and 20 slm $N_2$. The plurality of first orifices injected 9.4 slm $O_2$ and 40 slm $N_2$. The total time of injection was 240 seconds. The conformality of oxidized silicon dioxide was about 102%, and the GR was about 1.6 A/sqrt. Results are shown in Tables 1 and 2 below.

TABLE 1

| | Top 1 | Bottom 1 | Conf 1 | Top 2 | Bottom 2 | Conf 2 |
|---|---|---|---|---|---|---|
| Top Avg | 2.003 | 2.815 | 143% | 2.555 | 2.587 | 101% |
| Right Avg | 2.266 | 2.792 | 126% | 2.697 | 2.771 | 103% |
| Bottom Avg | 2.268 | 2.498 | 112% | 2.115 | 2.601 | 124% |
| Left Avg | 2.157 | 2.410 | 112% | 2.615 | 2.310 | 88% |
| Average | 2.173 | 2.629 | 121% | 2.495 | 2.567 | 103% |

TABLE 2

| | Top 3 | Bottom 3 | Conf 3 | Top 4 | Bottom 4 | Conf 4 |
|---|---|---|---|---|---|---|
| Top Avg | 2.220 | 2.240 | 103% | 2.302 | 2.270 | 99% |
| Right Avg | 2.668 | 2.553 | 96% | 2.638 | 2.277 | 87% |
| Bottom Avg | 2.638 | 2.773 | 106% | 2.334 | 2.417 | 104% |
| Left Avg | 2.721 | 2.406 | 88% | 2.592 | 2.261 | 88% |
| Average | 2.562 | 2.493 | 97% | 2.467 | 2.306 | 93% |

While the foregoing is directed to embodiments of the disclosure, other and further embodiments may be devised without departing from the basic scope thereof, and the scope thereof is determined by the claims that follow.

What is claimed is:

1. A process chamber for hydroxyl driven combustion, comprising:

a substrate support;

a plurality of orifices, wherein the plurality of orifices includes:

a plurality of first orifices positioned along a first side and a third side of the process chamber and oriented towards a first location of the process chamber, wherein the first side and the third side are substantially parallel to each other; and a plurality of second orifices positioned along a second side of the process chamber and oriented towards the first location of the process chamber, wherein the second side is substantially perpendicular to the first side and the third side; and a controller, wherein the controller is configured to:

heat the process chamber;

inject a first gas from the plurality of first orifices;

inject a second gas from the plurality of second orifices, wherein a radical is produced within the process chamber as a function of the heat, the first gas, and the second gas, and wherein the process chamber is maintained at a pressure greater than about 50 Torr during the injection of the first gas and the second gas.

2. The chamber of claim 1, wherein the first gas is a reactive gas comprising $H_2$ or $O_2$.

3. The chamber of claim 2, wherein the second gas is a reactive gas comprising $H_2$ or $O_2$, and wherein the second gas is different from the first gas.

4. The chamber of claim 1, wherein the plurality of second orifices comprises a range between about 2 to about 15 orifices.

5. The chamber of claim 4, wherein the plurality of second orifices is about 3 to about 8 orifices.

6. The chamber of claim 1, wherein the controller is configured to inject the first gas at a velocity of about 1 m/s to about 20 m/s.

7. The chamber of claim 1, wherein the controller is configured to inject the second gas at a velocity of about 1 m/s to about 20 m/s.

8. A method of hydroxyl driven combustion, comprising:

introducing, via a controller, a first gas into processing chamber using a plurality of first orifices positioned along a first side and a third side of the processing chamber, wherein the first side and the third side are substantially parallel to each other and the first orifices are oriented towards a first location of the processing chamber;

introducing, via the controller, a second gas into the processing chamber using a plurality of second orifices positioned along a second side of the processing chamber and oriented towards the first location of the processing chamber, wherein the second side is substantially perpendicular to the first side and the third side such that the first gas and the second gas intersect in the first location of the processing chamber; and wherein a radical is produced within the processing chamber as a function of the first gas and the second gas while heating the processing chamber, and wherein the processing chamber is maintained at a pressure greater than about 50 Torr during the injection of the first gas and the second gas.

9. The method of claim 8, wherein the first gas is a reactive gas comprising $H_2$ or $O_2$.

10. The method of claim 8, wherein the second gas is a reactive gas comprising $H_2$ or $O_2$, and wherein the second gas is different from the first gas.

11. The method of claim 8, wherein the first gas is injected at a volumetric flow of about 5 slm to about 40 slm.

12. The method of claim 11, wherein the first gas is injected at a volumetric flow of about 9.4 slm.

13. The method of claim 8, wherein the first gas is injected at a velocity of about 1 m/s to about 20 m/s.

14. The method of claim 13, wherein the first gas is injected at a velocity of about 10 m/s.

15. The method of claim 8, wherein the second gas is injected at a volumetric flow of about 5 slm to about 40 slm.

16. The method of claim 15, wherein the second gas is injected at a volumetric flow of about 22 slm.

17. The method of claim 8, wherein the second gas is injected at a velocity of about 1 m/s to about 20 m/s.

18. The method of claim 17, wherein the second gas is injected at a velocity of about 10 m/s.

19. The method of claim 8, wherein heating the processing chamber comprises heating to a temperature of about 700° C. to about 1,000° C.

20. A computer readable medium configured to:

introduce, via a controller, a first gas into a processing chamber using a plurality of first orifices positioned along a first side and a third side of the processing chamber, wherein the first side and the third side are substantially parallel to each other and the first orifices are oriented towards a first location of the processing chamber;

introduce, via the controller, a second gas into the processing chamber using a plurality of second orifices positioned along a second side of the processing chamber and oriented towards the first location of the processing chamber, wherein the second side is substantially perpendicular to the first side and the third side such that the first gas and the second gas intersect in the first location of the processing chamber and wherein a radical is produced within the processing chamber as a function of the first gas and the second gas while heating the processing chamber, and wherein the processing chamber is maintained at a pressure greater than about 50 Torr during the injection of the first gas and the second gas.

* * * * *